United States Patent
Wier

[19]

[11] Patent Number: 5,876,063
[45] Date of Patent: Mar. 2, 1999

[54] VEHICULAR SAFETY DEVICE

[75] Inventor: Franz Wier, Göggingen, Germany

[73] Assignee: TRW Occupant Restraint Systems GmbH, Alfdorf, Germany

[21] Appl. No.: 887,771

[22] Filed: Jul. 3, 1997

[30] Foreign Application Priority Data

Jul. 4, 1996 [DE] Germany ............ 296 11 657 U

[51] Int. Cl.⁶ .................. B60R 21/26; C06C 5/06
[52] U.S. Cl. ............ 280/741; 102/275.6; 102/275.12
[58] Field of Search .................... 280/741, 736; 102/322, 275.6, 275.11, 275.12, 202, 202.5, 202.14

[56] References Cited

U.S. PATENT DOCUMENTS

| | | |
|---|---|---|
| 3,532,359 | 10/1970 | Teague et al. ............ 280/741 |
| 3,797,854 | 3/1974 | Poole et al. ............ 280/741 |
| 3,891,233 | 6/1975 | Damon ............ 280/741 |
| 4,165,691 | 8/1979 | Bowman et al. ............ 102/322 |
| 4,370,930 | 2/1983 | Strasser et al. ............ 280/741 |
| 4,653,700 | 3/1987 | Crawford ............ 102/275.12 |
| 4,858,951 | 8/1989 | Lenzen ............ 280/741 |
| 5,639,986 | 6/1997 | Evans ............ 280/741 |

*Primary Examiner*—Paul N. Dickson
*Attorney, Agent, or Firm*—Tarolli, Sundheim, Covell, Tummino & Szabo

[57] ABSTRACT

A vehicular safety device for actuation of an occupant restraint means includes a cylinder tube having an axis, a cylinder wall with an outer envelope surface and a through-opening in the cylinder wall, a pyrotechnical gas generator material disposed in the interior of the cylinder tube adjoining the cylinder wall and an electrical igniter. The pyrotechnical gas generator material generates gas upon inflation for actuating the restraint means. The igniter is configured as an elongated body extending parallel to the axis and is applied to the outside of the envelope surface of the cylinder tube opposite the through-opening.

14 Claims, 2 Drawing Sheets

Fig. 3
Fig. 4
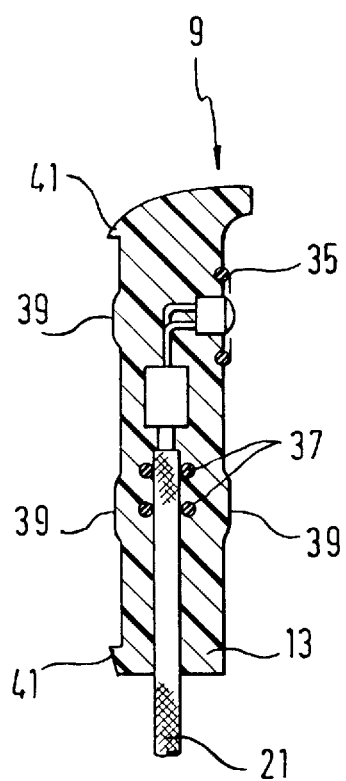
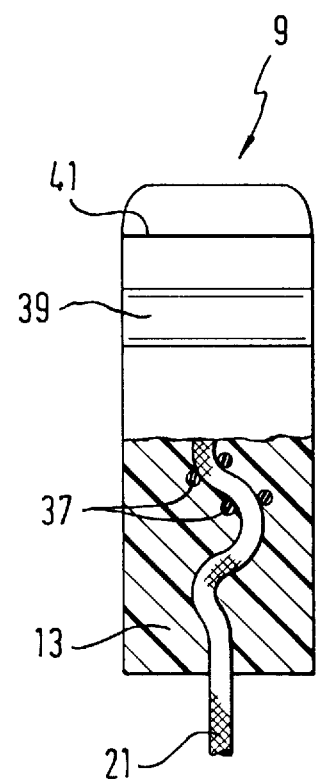

VEHICULAR SAFETY DEVICE

FIELD OF THE INVENTION

The invention relates to an vehicular safety device for actuation of an occupant restraint means, more particularly to a seat belt tensioner or to an inflation unit for a gas bag.

BACKGROUND OF THE INVENTION

Hitherto, in the case of inflation units for gas bags the electrical igniter stands far out from the side of the cylinder tube, the igniter mostly being non-releasably connected to the cylinder tube. For such an inflation unit correspondingly much installation space needs to be made available therefor in the vehicle, as a result of which space-availability may become a problem. Similar problems are also experienced in the case of linear drives, in which a projection usually protrudes from the side of the wall of a cylinder of a piston/cylinder unit in which gas generator material is accommodated and from which in turn the igniter, mostly firmly embedded in place, also protrudes. If the cylinder tube has no projection and if the gas generator material is disposed in the interior of the cylinder tube, then, however, the electrical igniter protrudes far away from the side of the cylinder tube. In addition to this, parts protruding from the side are physically endangered due to the long leverage arm involved.

BRIEF DESCRIPTION OF THE INVENTION

The invention defines a vehicular safety device which, on the one hand, is exposed to diminished physical stresses and, on the other, excels by requiring little installation space in the side direction so that the linear drive or the inflation unit is more compact. The vehicular safety device according to the present invention for actuation of an occupant restraint means includes a cylinder tube having an axis, a cylinder wall with an outer envelope surface and a through-opening in the cylinder wall, a pyrotechnical gas generator material disposed in the interior of the cylinder tube adjoining the cylinder wall and an electrical igniter. The pyrotechnical gas generator material generates gas upon inflation for actuating the restraint means. The igniter is configured as an elongated body extending parallel to the axis and is applied to the outside of the envelope surface of the cylinder tube opposite the through-opening.

Thus, the longitudinal axis of the inflation unit no longer extends as usual hitherto at right angles to the cylinder axis but parallel thereto so that the inflation unit hardly protrudes from the side of the cylinder tube. The igniter is applied to the cylinder tube, i.e. it forming an autonomous unit which may be connected not before the cylinder tube has been installed in the vehicle, as a result of which there is no risk of the igniter cable being damaged on installation of the cylinder tube. Moreover, the igniter may be shipped separate from the cylinder tube with the gas generator material accommodated therein so that any accidental priming of the pyrotechnical material during shipping is avoided.

According to the preferred embodiments, the safety device is a seat belt tensioner, especially a linear drive for a seat belt system or an inflation unit of a gas bag module. The seat belt system and the gas bag module define the occupant restraint means, respectively.

The safety device according to the invention comprises preferably an igniter having a body formed to be solid and of an insulating material, in which a squib, i.e. an ignition resistor surrounded by ignition material is embedded. The squib is located opposite the through-opening of the cylinder tube, particularly protruding thereinto, thus resulting in a desired minimum spacing from the gas generator material.

A cable connected to the squib, which is also embedded in the mass of the body, emerges preferably at the face end from the body so that it does not stand off from the side and is further embedded curved in the body of the igniter so that the point of connection to the squib has strain relief. The igniter is secured in accordance with the preferred embodiment by a tightening strap to the cylinder tube.

BRIEF DESCRIPTION OF THE DRAWINGS

FIG. 4 is a rear view of the igniter according to FIG. 3, shown partly exposed.

DETAILED DESCRIPTION OF PREFERRED EMBODIMENTS

Figure 1A:
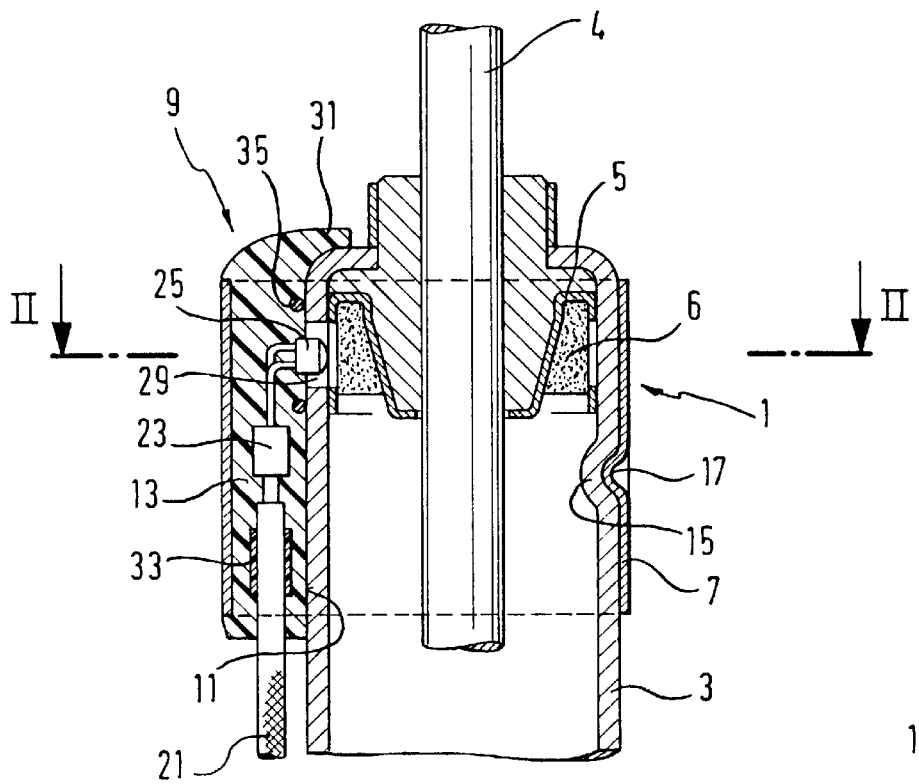
FIG. 1a is a longitudinal section view through a safety device according to the invention in the form of a seat belt tensioner, more precisely in the form of a linear drive.

In FIG. 1a, a seat belt tensioner, more particularly a linear drive 1 for a seat belt tensioner is shown, comprising a cylinder tube 3 in which a piston having an adjoining piston rod 4 is shiftably arranged. In the interior of the cylinder tube 3 pyrotechnical gas generator material 6 adjoins the cylinder wall, separated therefrom merely by a thin surrounding sleeve 5. Secured to the outer envelope surface of the cylinder tube 3 by a tightening strap 7, produced from a tubular section, is an electrical igniter 9. The tightening strap 7 surrounds the igniter 9 and the cylinder tube 3 and presses the igniter 9 by its inner side 11 against the cylinder tube 3. For a better secure location of the cylinder tube 3, tightening strap 7 and igniter 9 with respect to each other, the cylinder tube 3 features an indentation 15 into which a projection 17 penetrates at the tightening strap 7.

Figure 1B:
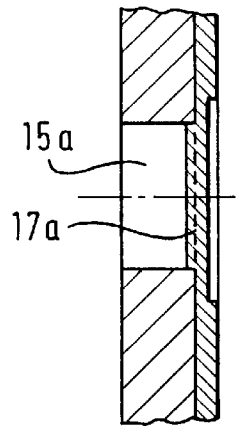
FIG. 1b is a section view of the safety device in FIG. 1a, wherein the kind of attachment of the igniter to the cylinder is modified.
Figure 2:
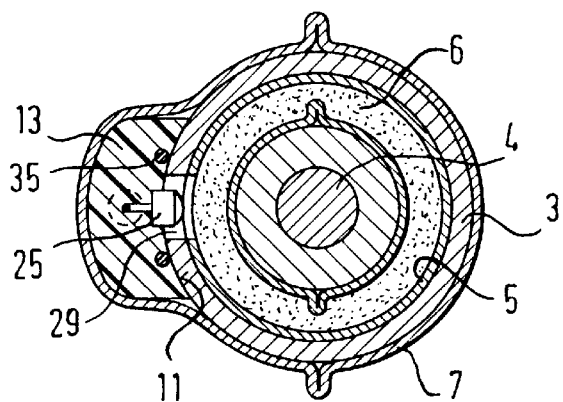
FIG. 2 is a section view along the line II—II in FIG. 1a, FIG. 3 is a longitudinal section view through an igniter slightly modified with respect to that shown in FIGS. 1a, 1b and 2.

FIG. 1b shows a further embodiment according to which the cylinder wall has an opening 15a into which a correspondingly formed indentation 17a extends.

Furthermore, the inner side 11 is adapted to the outer contour of the cylinder tube 3, as a result of which the igniter 9 not only protrudes less from the cylinder tube 3, but is also locked against turning.

The igniter 9 is configured as an elongated body which is secured parallel to the cylinder axis on the cylinder tube 3 and is solidly formed of insulating material 13. Embedded in the body is a cable 21 which protrudes from the face end thereof. Also embedded in the body are a high-frequency choke 23 and a squib 25 adjoining the latter. The connecting leads of the squib 25 are bent at right angles towards the inner side 11.

The squib 25 protrudes slightly from the body and, in the fitted condition of the igniter 9, protrudes into a through-opening 29 in the cylinder tube 3 leading to the gas generator material 6.

The axial location of the igniter 9 needs to be oriented with respect to the cylinder tube 3, so that the squib 25 always adjoins the through-opening 29 or protrudes thereinto. For a better definition of the igniter 9 its body has a nose 31 at its upper face protruding in the direction of the cylinder tube 3 which engages the face end of the cylinder tube 3 and is shaped adapted to the outer contour of the cylinder tube 3.

For reliably sealing off any ingress of moisture seals are embedded in the body. A seal 33 surrounds the cable 21. A further seal 35 surrounds the squib 25 and is in sealing contact with the envelope of the cylinder tube 3.

In the case of igniter 9 shown in FIG. 3 the cable 21 is embedded curved in the body so that tugging the cable 21 from the body is made difficult. Furthermore, two seals 37 instead of one seal 33 are provided. Protrusions 39 on the outer side of the body which are in contact with the tightening strap 7 serve to locally increase the compression caused by the tightening strap 7 with respect to the seals 35 and 37. Also serving this purpose is a protrusion 39 on the inner side 11 of the body which is provided on the level with the seals 37.

Projections 41 on the outer side of the body additionally hold the tightening strap 7 at least in the axial direction on the body.

Due to the elongated configuration of the igniter 9 less installation space is needed in the vehicle for the safety device as a whole. The igniter 9 may be relatively long, as a result of which its hold on the cylinder tube 3 is improved. The secure fastening and the compact dimensions of the igniter 9, as viewed at right angles to the cylinder axis, protect it from being accidentally removed from the cylinder tube 3 or from being shifted relative thereto due to prohibitive pilling of the cable 21.

I claim:

1. A vehicular safety device for actuation of an occupant restraint means, including a cylinder tube having an axis, a cylinder wall with an outer envelope surface and a radially extending through-opening in said cylinder wall, a pyrotechnical gas generator material disposed in the interior of said cylinder tube adjoining said cylinder wall and an electrical igniter, said pyrotechnical gas generator material generating gas upon inflation for actuating said restraint means, said igniter being configured as an elongated body extending parallel to said axis and being applied to the outside of said envelope surface of said cylinder tube opposite said through-opening.

2. The safety device as set forth in claim 1, wherein said vehicular safety device is a seat belt tensioner for a seat belt system, said seat belt system defining said occupant restraint means.

3. The safety device as set forth in claim 1, wherein said vehicular safety device is an inflation unit of a gas bag module, said gas bag module defining said occupant restraint means.

4. The safety device as set forth in claim 1, wherein a squib is embedded in said body formed to be solid and of an insulating material, located opposite said through-opening of said cylinder tube.

5. The safety device as set forth in claim 4, wherein said squib protrudes into said cylinder tube.

6. The safety device as set forth in claim 4, wherein a cable is connected to said squib and is also embedded in the mass of said body, said body having a face end from which said cable emerges.

7. The safety device as set forth in claim 4, wherein a seal surrounding a cable is embedded in said body of said igniter.

8. A vehicular safety device of an occupant restraint means, including a cylinder tube having an axis, a cylinder wall with an outer envelope surface and a through-opening in said cylinder wall, a pyrotechnical gas generator material disposed in the interior of said cylinder tube adjoining said cylinder wall and an electrical igniter, said pyrotechnical gas generator material generating gas upon inflation for actuating said restraint means, said igniter being configured as an elongated body extending parallel to said axis and being applied to the outside of said envelope surface of said cylinder tube opposite said through-opening, wherein a squib is embedded in said body formed to be solid and of an insulating material, located opposite said through-opening of said cylinder tube, wherein a seal surrounding a cable is embedded in said body of said igniter, and wherein said cable is embedded curved in said body of said igniter.

9. A vehicular safety device of an occupant restraint means, including a cylinder tube having an axis, a cylinder wall with an outer envelope surface and a through-opening in said cylinder wall, a pyrotechnical gas generator material disposed in the interior of said cylinder tube adjoining said cylinder wall and an electrical igniter, said pyrotechnical gas generator material generating gas upon inflation for actuating said restraint means, said igniter being configured as an elongated body extending parallel to said axis and being applied to the outside of said envelope surface of said cylinder tube opposite said through-opening, wherein a squib is embedded in said body formed to be solid and of an insulating material, located opposite said through-opening of said cylinder tube, and wherein a seal surrounding said squib is embedded in said body of said igniter, which seal is in sealing contact with said envelope surface of said cylinder tube.

10. A vehicular safety device of an occupant restraint means, including a cylinder tube having an axis, a cylinder wall with an outer envelope surface and a through-opening in said cylinder wall, a pyrotechnical gas generator material disposed in the interior of said cylinder tube adjoining said cylinder wall and an electrical igniter, said pyrotechnical gas generator material generating gas upon inflation for actuating said restraint means, said igniter being configured as an elongated body extending parallel to said axis and being applied to the outside of said envelope surface of said cylinder tube opposite said through-opening, wherein a tightening strap is provided and wherein said body of said igniter is affixed to said cylinder tube by said tightening strap surrounding both.

11. The safety device as set forth in claim 10, wherein said body of said igniter has at least one protrusion adjoining said envelope surface of said cylinder tube and locally increasing pressure on said seal due to a compression caused by said tightening strap.

12. The safety device as set forth in claim 10, wherein said body of said igniter has at least one protrusion adjoining said tightening strap and increasing pressure on said seal due to a compression caused by said tightening strap.

13. The safety device as set forth in claim 10, wherein projections are provided on said body for holding said tightening strap.

14. The safety device as set forth in claim 10, wherein said cylinder tube includes at least one indentation and said strap has a projection at the inner side of is corresponding to said indentation, into which it penetrates.

* * * * *